United States Patent [19]

Enokida

[11] Patent Number: 5,760,847
[45] Date of Patent: Jun. 2, 1998

[54] PROCESSING MOVING IMAGE DATA BASED ON AN ARBITRARILY DESIGNATED FRAME

[75] Inventor: Miyuki Enokida, Yokohama, Japan

[73] Assignee: Canon Kabushiki Kaisha, Tokyo, Japan

[21] Appl. No.: 623,373

[22] Filed: Mar. 28, 1996

[30] Foreign Application Priority Data

Mar. 30, 1995 [JP] Japan ................. 7-073326

[51] Int. Cl.[6] ................. H04N 7/32; H04N 7/30
[52] U.S. Cl. ................. 348/700; 348/699; 386/111; 345/327; 345/328
[58] Field of Search ................. 348/402, 405, 348/700, 699, 390, 384, 401–407, 412–413, 415–416; 386/33, 109, 111–112; 382/232, 233, 236, 238; 345/327, 328; H04N 7/32, 7/30

[56] References Cited

U.S. PATENT DOCUMENTS

| | | | |
|---|---|---|---|
| 5,140,437 | 8/1992 | Yonemitsu et al. | 386/111 |
| 5,191,436 | 3/1993 | Yonemitsu | 386/52 |
| 5,270,828 | 12/1993 | Mogi | 386/109 |
| 5,414,455 | 5/1995 | Hooper et al. | 348/7 |
| 5,453,790 | 9/1995 | Vermeulen et al. | 348/384 |
| 5,467,134 | 11/1995 | Laney et al. | 348/415 |
| 5,473,370 | 12/1995 | Moronaga et al. | 386/109 |
| 5,497,239 | 3/1996 | Kwon | 386/111 |
| 5,502,570 | 3/1996 | Shikakura et al. | 386/109 |
| 5,521,898 | 5/1996 | Ogasawara | 369/124 |
| 5,534,928 | 7/1996 | Iwamura | 348/700 |
| 5,557,332 | 9/1996 | Koyanagi et al. | 348/700 |
| 5,561,465 | 10/1996 | Fautier et al. | 348/415 |
| 5,561,476 | 10/1996 | Kershaw et al. | 348/700 |
| 5,570,197 | 10/1996 | Boon | 348/405 |
| 5,576,765 | 11/1996 | Cheney et al. | 348/415 |
| 5,577,191 | 11/1996 | Bonomi | 348/384 |
| 5,589,884 | 12/1996 | Ohguchi | 348/700 |
| 5,596,369 | 1/1997 | Chau | 348/402 |
| 5,602,592 | 2/1997 | Mori et al. | 348/415 |

*Primary Examiner*—Howard W. Britton
*Assistant Examiner*—Vu Le
*Attorney, Agent, or Firm*—Fitzpatrick, Cella, Harper & Scinto

[57] ABSTRACT

Input encoded moving image data constituted by a plurality of frames including image data for at least one frame which is encoded by an intra-frame mode and image data encoded by an inter-frame mode is accumulated in, e.g., an accumulating apparatus in the form that allows proper reproduction of moving image data from a frame desired by an operator on the apparatus side to an arbitrary frame. In order to realize this processing, there is provided an image processing apparatus for processing input encoded moving image data constituted by a plurality of frames including image data for at least one frame which is encoded by the intra-frame mode and image data encoded by the inter-frame mode, comprising designation means for designating an arbitrary frame of the input encoded moving image data, decoding means for sequentially decoding the input encoded moving image data, first output means for determining the header frame of frames designated by the designation means, and outputting the header frame after it is decoded by the decoding means, and second output means for outputting input encoded moving image data following the header frame.

33 Claims, 7 Drawing Sheets

PROCESSING MOVING IMAGE DATA BASED ON AN ARBITRARILY DESIGNATED FRAME

BACKGROUND OF THE INVENTION

1. Field of the Invention

The present invention relates to an image processing apparatus and system and, more particularly, to an image processing apparatus and system suitable for moving image editing processing.

2. Related Background Art

As a moving image encoding method for a video conference system or the like, the H261 scheme is available.

The encoding method based on the H261 scheme has been developed for video conference systems and video telephone systems. Based on the assumption that it is used for communication purposes, this scheme has a low bit rate of p·X·64 kbit/sec and a simple algorithm, attaching great importance to real-time performance.

According to the H261 scheme, of the frames to be encoded, only the header frame is subjected to INTRA encoding (intra-frame encoding), and the succeeding frames are subjected to INTER encoding (only difference data obtained when motion compensation is performed between the preceding frame and the frame to be encoded is encoded).

Consider a terminal which is receiving/decoding/displaying data encoded by the above conventional H261 scheme in real time. Assume that moving image data of a moving image which is currently displayed is to be accumulated in an accumulation medium, starting from an intermediate portion of the image. In this case, the encoded frame image data of an intermediate portion of a moving image is constituted by INTER data (difference data). For this reason, if accumulation is started from the intermediate data, image data is generally accumulated with difference data being the header frame. In reproduction processing, since the difference data is reproduced as the data of the header frame, a proper moving image cannot be reproduced.

Data is generally accumulated in the form that allows reproduction of a good image by the following method even in a case wherein accumulation is started from intermediate data. The reception side sends an accumulation request (refresh request or the like) to the transmission side so as to force the transmission side to insert an INTRA frame. With this operation, data is accumulated as encoded data without any change, starting from the INTRA frame, on the reception side. In this method, however, both the reception/transmission sides are burdened with excessive communication and processing. In addition, an arrangement in which data is encoded into an INTRA frame on the transmission side in accordance with a request from the reception side to the transmission side requires procedures for sending a refresh request from the reception side to the transmission side via a communication line, and performing INTRA encoding on the transmission side upon reception of the refresh request. A predetermined period of time is therefore required for communication processing, and a frame delayed from the frame at a designated accumulation time is INTRA-encoded. For this reason, a frame delayed from a desired frame which the operator wants to accumulate is encoded into an INTRA frame, and accumulation is started from the delayed INTRA frame. Furthermore, on the reception side, a frame encoded as an INTRA frame must be detected.

SUMMARY OF THE INVENTION

It is an object of the present invention to provide an image processing apparatus and system which solve the above drawbacks.

It is another object of the present invention to provide an image processing apparatus and system which can accumulate H261-encoded data in accordance with an instruction from the reception apparatus side in the form that allows proper reproduction.

It is still another object of the present invention to provide an image processing apparatus and system which can accumulate H261-encoded data as the data encoded in the H261 scheme without any modification and still allows proper reproduction of the data.

According to an aspect of the present invention, there is provided an image processing apparatus for processing input encoded moving image data constituted by a plurality of frames including image data for at least one frame which is encoded by an intra-frame mode and image data encoded by an inter-frame mode, comprising designation means for designating an arbitrary frame of the input encoded moving image data, decoding means for sequentially decoding the input encoded moving image data, first output means for determining a frame designated by the designation means, and outputting the designated frame after the frame is decoded by the decoding means, and second output means for outputting input encoded moving image data following the designated frame.

It is still another object of the present invention to provide an image processing apparatus and system which have new functions.

The above and other objects, features, and advantages of the present invention will be apparent from the following detailed description in conjunction with the accompanying drawings and the appended claims.

DETAILED DESCRIPTION OF THE PREFERRED EMBODIMENTS (First Embodiment)

Figure 1:
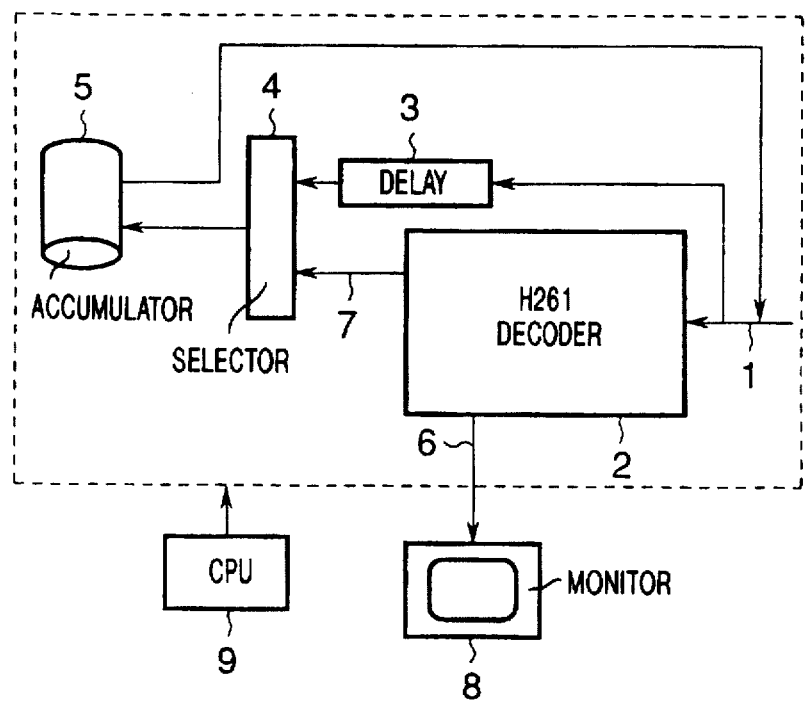
FIG. 1 is a block diagram showing the schematic arrangement of the first embodiment of the present invention.

FIG. 1 is a block diagram showing the schematic arrangement of an image processing apparatus according to the first embodiment of the present invention. Referring to FIG. 1, moving image data 1 encoded by the H261 scheme is received from a network/communication means such as an ISDN (not shown). This apparatus includes an H261 decoder 2, a delay circuit 3 realized by a memory such as a FIFO memory, a selector 4, and an accumulating apparatus 5 such as a hard disk, a CD-ROM, an FD, or an optical disk. A video signal 6 for a display operation is output from the H261 decoder 2 to a monitor 8. An image data signal 7 is stored in a reference frame memory in the H261 decoder 2. A CPU 9 controls each block described above. As is apparent, it suffices to use a CRT, an FLCD, or the like as the above monitor.

Figure 2:
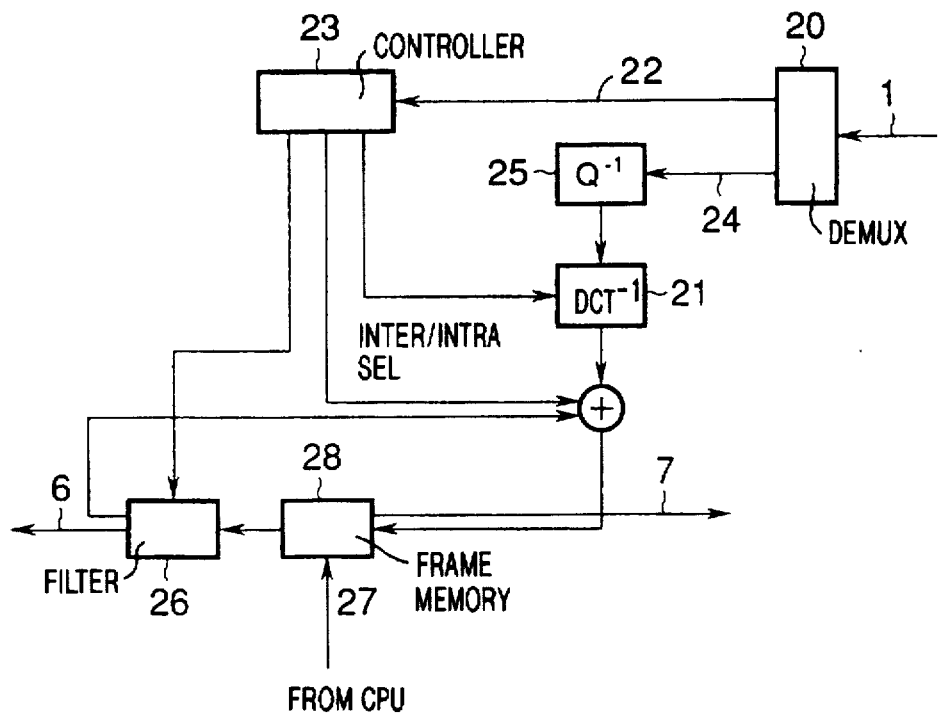
FIG. 2 is a block diagram showing an H261 decoder.

FIG. 2 is a block diagram showing the detailed arrangement of the H261 decoder 2 in FIG. 1, which is a known device. The H261 decoder 2 includes a demultiplexer 20 for separating H261-encoded data into a DCT coefficient signal 24 and other information, and an inverse DCT operation unit 21. An information signal 22 for control is separated by the demultiplexer 20. A control unit 23 controls the decoder. The H261 decoder 2 also includes an inverse quantization operation unit 25, an intra-loop filter operation unit 26, and a frame memory 28 for storing a reference frame. A signal 27 is used to extract image data from the frame memory 28.

In general, received H261-encoded data is input to the demultiplexer 20 via the signal line 1 and subjected to inverse DCT, inverse quantization, or the like as decoding processing in accordance with the conditions for the encoded data, thereby generating a reproduced image. This image is displayed as the video signal 6 on the monitor 8. This image signal decoded as a reference frame is written in the frame memory 28. The above processing is repeated until no encoded moving image data is input or no decode/display request is generated by the user.

Assume that while such H261-encoded moving image data is received/decoded/displayed, the user accumulates frames from an arbitrary intermediate frame to another arbitrary frame in an accumulation medium such as a hard disk with the currently received encoded image data being set as a header frame. This operation will be described next.

Figure 3:
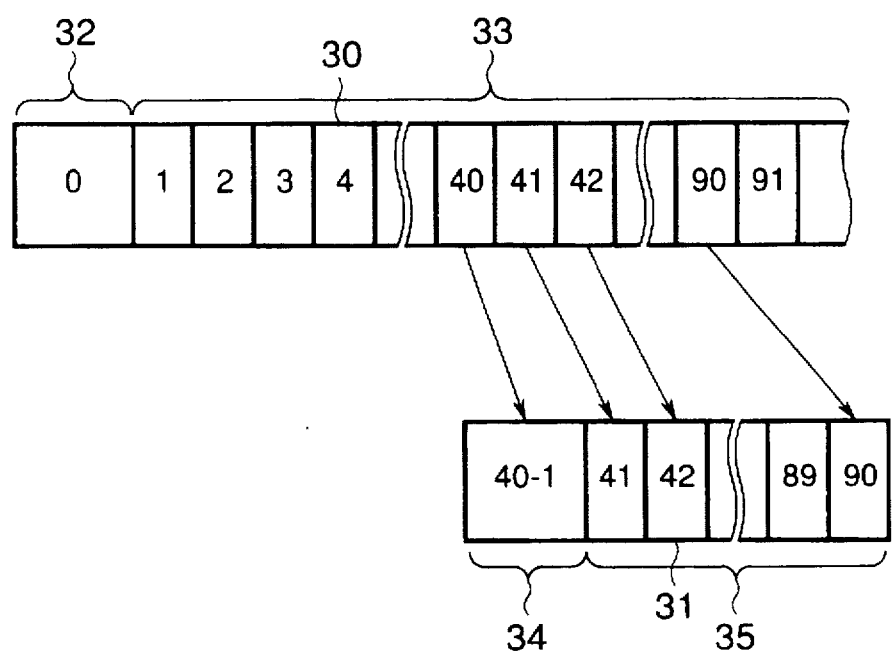
FIG. 3 is a view showing the concept of encoded data to be input/accumulated.
Figure 5:
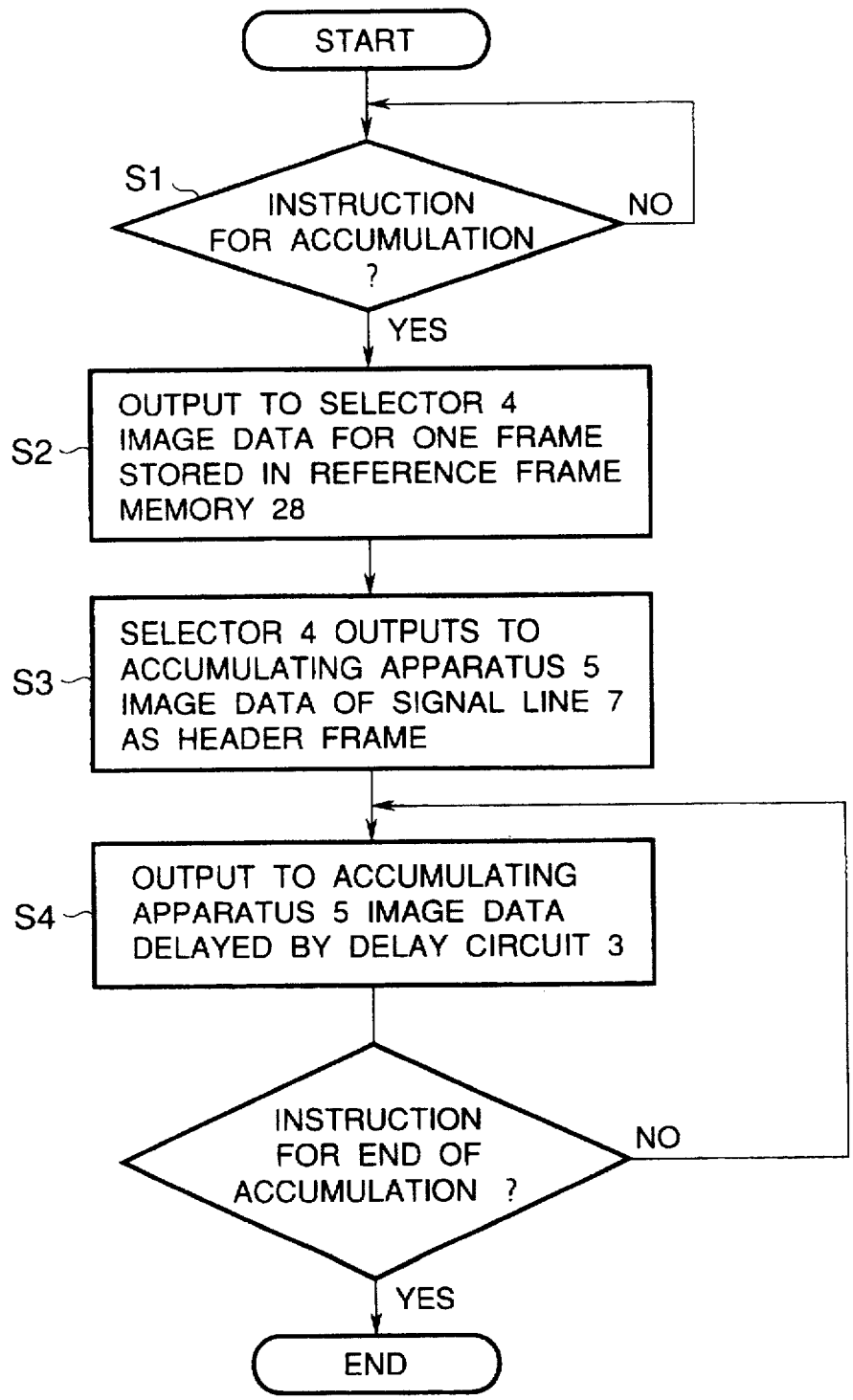
FIG. 5 is a flow chart showing processing performed in the first embodiment.
Figure 6:
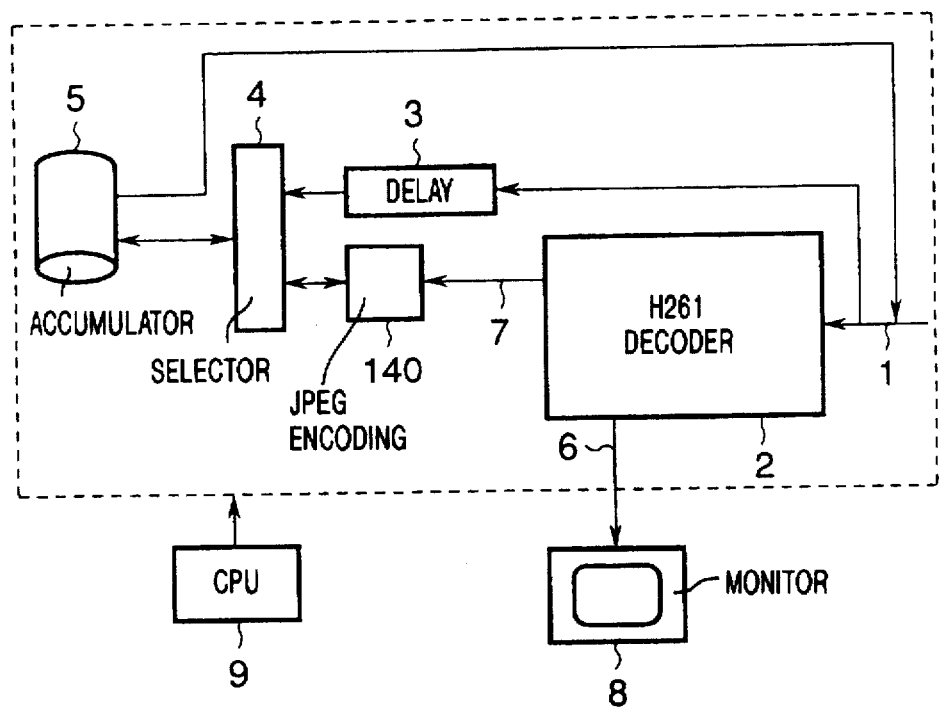
FIG. 6 is a block diagram showing the schematic arrangement of the third embodiment of the present invention.

FIG. 3 shows the concept of received H261-encoded data and H261-encoded data to be accumulated in this embodiment. Of received encoded data 30, only the 0th frame, i.e., a header frame 32, is encoded into an INTRA frame, and other frames 33 (1st to 91st frames) following the header frame are encoded into INTER frames. The operation principle of this embodiment will be described in detail with reference to FIGS. 1 to 3. FIG. 5 is a flow chart showing processing in the embodiment.

For the sake of a simple description, assume that the user receives and decodes/displays the H261-encoded data 30 in real time. Also, assume that the user has displayed data from the 0th frame to the 39th frame, and is about to display the 40th frame. Assume that the user wants to accumulate encoded data from the 40th frame to the 90th frame in the hard disk. In this case, the user instructs accumulation of the data with a pointing device (designation means) such as a mouse (not shown) (step S1).

In accordance with the instruction from the designation means, the CPU 9 supplies a signal to the H261 decoder 2 via the signal line 27, requesting output of image data for one frame, which corresponds to an image currently displayed on the monitor 8 and is stored in the frame memory 28, to the accumulating apparatus 5. In response to this signal, the H261 decoder 2 outputs the image data from the reference frame memory 28 to the accumulating apparatus 5 via the signal line 7. This signal is input to the selector 4 (step S2). The selector 4 outputs image data for one frame, which is input from the signal line 7, as the header frame (frame 40) of the frames of the image data to be accumulated under the control of the CPU 9, and outputs the remaining frames (frames 41 to 90) from the delay circuit 3 (step S3). The delay circuit 3 delays encoded data directly sent from the encoded input signal. With this operation, when the time taken to read out image data from the reference frame memory 28 is longer than the time taken to input the next frame (the 41st frame in this case), the timing at which the encoded data of the 41st frame is input to the selector 4 is adjusted such that the encoded data for the 41st frame is input to the selector 4 after the image data for the 40th frame is output (step S4). After this operation, the delay circuit 3 is used to adjust the time taken to write encoded data in the accumulating apparatus 5, and the time required for an input operation. Note that the above accumulation processing is continued until the CPU 9 detects an instruction for the end of accumulation which is input from the above designation means (step S5). Note that the designation means may designate the 40th frame as a header frame and accumulation of the subsequent 50 frames, and the CPU 9 may output an instruction for the end of accumulation after accumulating 50 frames.

In accordance with the above flow of processing, the image data for the 40th frame is stored in the accumulating apparatus 5 without any modification. With regard to the subsequent frames, H261-encoded data which is input in real time is directly stored as encoded data without any modification in the hard disk.

This processing is be performed up to the frame desired by the user. In this embodiment, encoded data may be written up to the 90th frame.

With this processing, encoded data 31 in FIG. 3, i.e., encoded data constituted by image data for a 40th frame 34 as a header frame and succeeding H261-encoded data 35 from the 41st frame to the 90th frame, can be created.

That is, in the accumulating apparatus 5, one-frame image data which is not encoded is stored as image data for the 40th frame, and difference data are stored as image data for the 41st to 90th frames. With the above arrangement, reproduction can be properly performed, and the storage capacity of the accumulating apparatus 5 can be reduced. Data accumulated in the accumulating apparatus 5 is displayed in the following manner. In response to an instruction for reproduction from the designation means, the image data for the header frame is read from the accumulating apparatus 5. The header frame image data is then loaded into the reference frame memory 28 in the decoder by setting the inverse DCT operation unit 21 and the inverse quantization operation unit 25 in FIG. 2 in the through mode. Thereafter, the above general H261 decoding processing is performed to reproduce the encoded data accumulated in the accumulating apparatus 5. Note that the above reproduction processing is also performed under the control of the CPU 9.

With the above arrangement, H261-encoded moving image data can be accumulated in the accumulating apparatus 5, e.g., an accumulation medium such as a hard disk, a CD-ROM, or an FD without performing any special processing on the transmission side in the form that allows proper reproduction of image data from one arbitrary frame to another on the reception side (decoder side).

(Second Embodiment)

In the first embodiment, as the header frame of a moving image sequence to be accumulated, decoded image data stored in the reference frame memory in the decoder is stored in the accumulation medium. In the second embodiment, this header frame is intra-frame encoded and stored. Consider an encoding scheme using an H261 INTRA frame as an intra-frame encoding scheme in the second embodiment.

Figure 4:
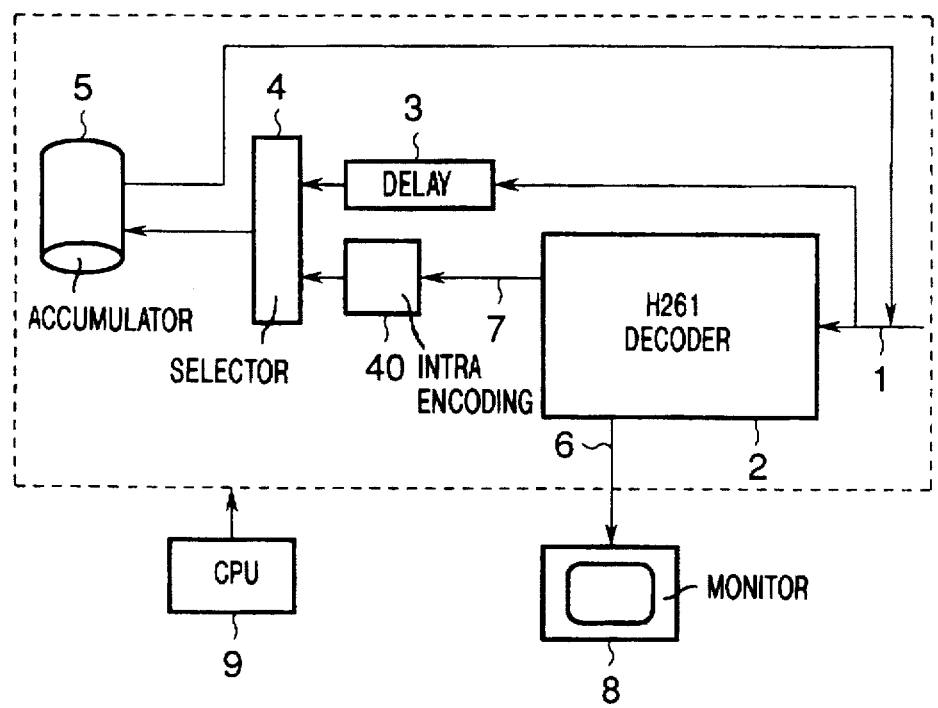
FIG. 4 is a block diagram showing the schematic arrangement of the second embodiment of the present invention.

FIG. 4 is a block diagram showing the schematic arrangement of the second embodiment. The same reference numerals in FIG. 4 denote parts which operate in the same manner as in FIG. 1. Referring to FIG. 4, an H261 INTRA encoding unit 40 encodes data by using an H261 INTRA frame. In this embodiment, as frames following the header frame, input H261-encoded data are accumulated as encoded data without any modification. For this reason, the encoding unit 40 does not require a portion for encoding an INTRA frame.

The operation principle of this embodiment will be described in detail next. A repetitive description of the same parts as those in the first embodiment will be avoided. The second embodiment is different from the first embodiment only in the method of accumulating the header frame of a moving image sequence to be accumulated. Therefore, only this method will be described below.

After image data for the 40th frame is read out from the reference frame memory in the decoder in the first embodiment, the H261 INTRA encoding unit 40 is started by a CPU 9 to convert this frame into encoded data for the H261 INTRA frame. The obtained data is input to a selector 4 and stored in a hard disk. The subsequent processing is the same as in the first embodiment.

A delay circuit 3 delays the H261 INTRA frame from the encoding unit 40 by the time taken for encoding. The remaining frames are processed in the same manner as in the first embodiment.

The encoded data accumulated in this embodiment can be reproduced by the general H261 decoding sequence in response to an instruction of reproduction from a designation means under the control of the CPU 9. Reproduction processing can therefore be performed without requiring any special circuit configuration. In addition, the data amount of the header frame can be reduced.

(Third Embodiment)

In the second embodiment, the header frame of a moving image sequence to be accumulated is encoded by using an H261 INTRA frame. However, as the intra-frame encoding scheme, the JPEG scheme which is an encoding scheme for a still image may be used. In the third embodiment, encoding is performed by using the JPEG scheme as the intra-frame encoding scheme.

The schematic block diagram showing this embodiment is the same as that showing the second embodiment except that the H261 INTRA encoding unit 40 in FIG. 4 is replaced with a JPEG encoding/decoding unit 140. In accumulation processing, JPEG encoding is performed instead of encoding with an H261 INTRA frame. A detailed description of the operation principle of accumulation processing will be omitted.

In this case, in reproducing accumulated encoded data, the JPEG encoding/decoding unit 140 decodes the encoded data for the header frame, and the image data must be loaded into a reference frame memory in an H261 decoder in the same manner as in the first embodiment. Since each of the succeeding frames is H261 INTER data (difference data), the general H261 decoding sequence may be performed in the same manner as in the first embodiment.

In this embodiment, since the header frame is encoded by the still image encoding scheme, the accumulated moving image data includes a plurality of encoded data groups (from the 40th frame to the 90th frame, from the 100th frame to the 120th frame, and the like). Assume that a moving image to be displayed is to be retrieved from the data groups. In this case, when, for example, only a list of representative frames are to be displayed as still images, such retrieval processing can be easily performed by decoding and displaying header frames (JPEG-encoded frames), although the data processing method depends on the method of retrieving a moving image.

This encoding scheme allows accumulation of high-quality images as compared with the encoding scheme using an H261 INTRA frame.

The operation of the delay circuit 3 has been described above in the first, second, and third embodiments. It is, however, apparent that this delay circuit is not required if the speed at which image data is read out from the reference frame memory, the speed of H261 INTRA/JPEG encoding, and the speed at which data is written in the hard disk are sufficiently high.

In the above embodiments, H261-encoded data to be input is received via a communication line in real time. However, the present invention is not limited to this. As is apparent, the present invention can also be applied to a case wherein data encoded in advance by the H261 scheme is stored in an accumulating apparatus or the like, and a desired frame is extracted from an intermediate portion of the encoded data to be stored in another accumulation apparatus.

(Fourth Embodiment)

Figure 7:
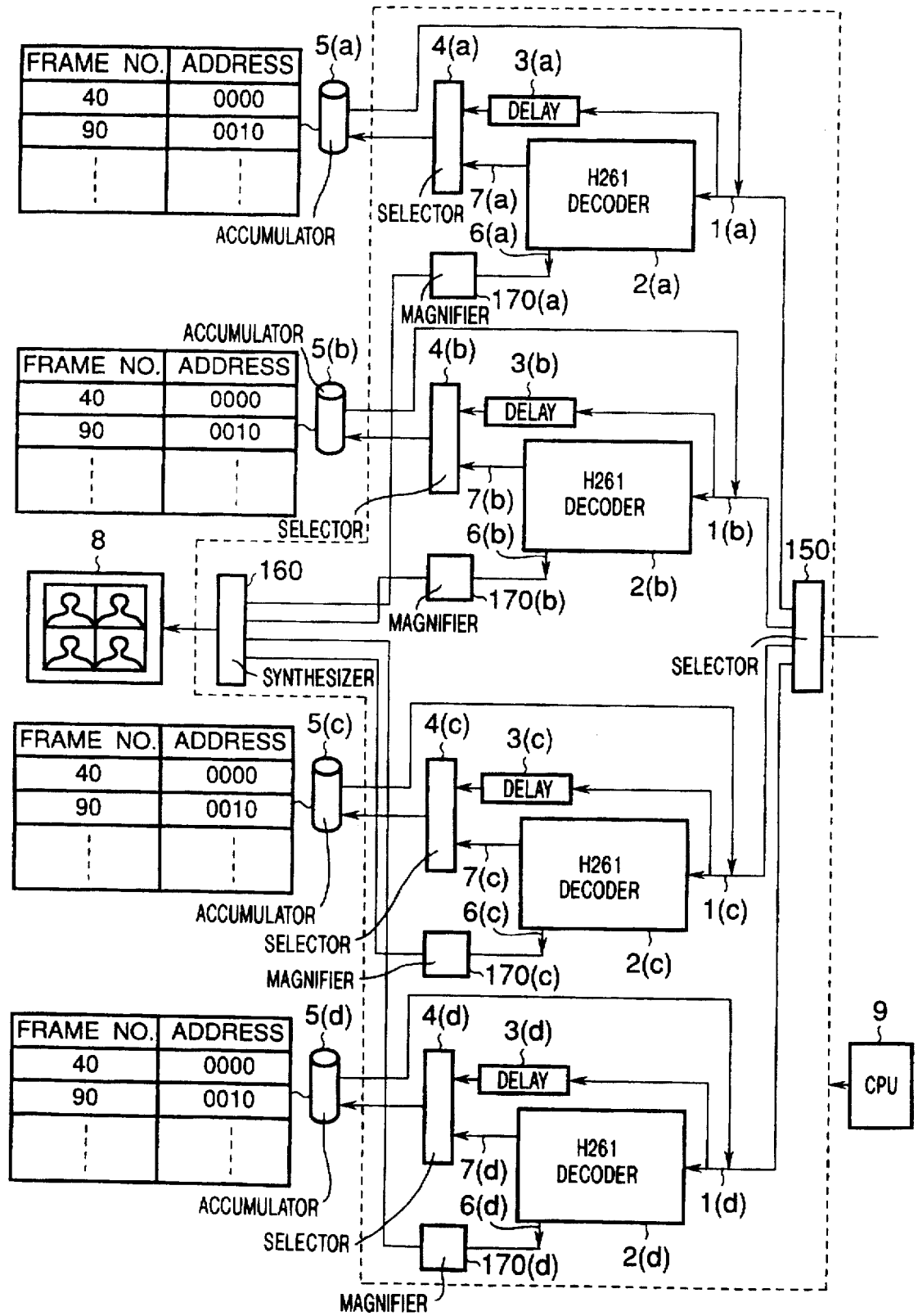
FIG. 7 is a block diagram showing the arrangement of the fourth embodiment of the present invention.

FIG. 7 shows the fourth embodiment, in which the above techniques are applied to a video conference/telephone system having a multi-image display function.

As shown in FIG. 7, according to this embodiment, for example, in a video conference/telephone system in which image data transmitted from a plurality of terminals (four terminals) (a) to (d) are displayed as a multi-image, only a predetermined frame of encoded data from each terminal is accumulated in accordance with an operation performed by the user in the form that allows proper reproduction. This embodiment includes the four terminals. As is apparent, however, the present invention is not limited to this.

FIG. 7 shows the arrangement of this embodiment. The same reference numerals in the fourth embodiment denote the same parts as in the first embodiment, and a description thereof will be omitted. Note that the above four terminals are denoted by reference symbols (a) to (d), respectively, as shown in FIG. 7.

A selector 150 distributes image data transmitted from a plurality of terminals to H261 decoders provided for the respective terminals. Header information for identifying data transmitted from a specific terminal is added to each of the image data transmitted from the plurality of terminals. The selector 150 performs distribution processing in accordance with such identification information.

Reduction units 170(a) to 170(d) perform magnifying processing of data decoded by decoders 2(a) to 2(d) to perform multi-image display on a monitor 8. Note that the magnification of each reduction unit is determined on the basis of the display size of the monitor and the division number in each display operation. A CPU 9 causes each reduction unit to perform image reduction processing in accordance with this magnification. A synthesizer 160 synthesizes the image data reduced by the reduction units 170(a) to 170(d) to display the data on the monitor 8.

The operation of the fourth embodiment in FIG. 7 will be described below.

H261-encoded data received via a network such as an ISDN is separated into encoded image data for the respective terminals by the selector 150. The image data are then input to the H261 decoders 2(a) to 2(d) for the respective terminals.

The decoded image data are input to the reduction units 170(a) to 170(d) of the respective terminals to be reduced to a size allowing multi-image display. The reduced image data are synthesized by the synthesizer 160 and displayed as a multi-image on the monitor 8. The user inputs an instruction for accumulation with a pointing device (designation means) such as a mouse (not shown) when a desired frame is displayed. In response to the instruction from the designation means, the CPU 9 accumulates image data for one frame as a header frame, which is stored in a reference frame memory 28 of each H261 decoder 2, in each accumulating apparatus 5 without performing reduction processing. Note that in an accumulating operation, the accumulation address of each image data and a corresponding frame number are stored as index information at a predetermined address in each accumulating apparatus. Frames following the frame image data (header frame) stored in each reference frame memory 28 are output from each delay circuit 3, and encoded image data corresponding to the desired number of frames designated by the user are sequentially stored at addresses following the address at which the image data for the header frame is accumulated.

With the above flow of processing, the image data transmitted from the respective terminals are accumulated, as full-frame image data unlike the image data displayed on the monitor 8, in each accumulating apparatus 5.

A reproducing operation will be described next. In a reproducing operation, the user can designate a multi-image reproduction mode or standard reproduction mode with the designation means.

When the multi-image reproduction mode is designated, image data corresponding to a frame designed by the user with the designation means is retrieved from each of the accumulating apparatuses 5(a) to 5(d) on the basis of index information. The retrieved image data are reproduced by the decoders 2(a) to 2(d) of the respective terminals and synthesized by the synthesizer 160, thereby performing multi-image reproduction. In this embodiment, since the header frame of the designated frames is not encoded by the H261 scheme, the header frame is reproduced while an inverse DCT operation unit and an inverse quantization operation unit in each H261 decoder are set in the through mode, similar to the first embodiment. From the frame next to the header frame, the inverse DCT operation unit and the inverse quantization operation unit are activated.

When the standard reproduction mode is designated, the user designates a frame No. and a terminal No. indicating a terminal which transmits image data the user wants to reproduce.

Upon designation of the frame No. and the terminal No., an image corresponding to the desired frame No. from the desired terminal is reproduced as a full-scale (not reduced) image. Since the flow of reproduction processing is the same as that in the first embodiment, a description thereof will be omitted.

As is apparent, in the standard reproduction mode, each reduction unit 170 is set in the through (inoperative) mode.

All the above reproduction processing is performed under the control of the CPU 9.

In the above case, the header frame is accumulated in the accumulating apparatus 5 without being encoded. As is apparent, however, this frame may be H261-encoded or JPEG-encoded as in the second or third embodiment.

As has been described above, according to the above embodiments, there is provided an image processing apparatus for processing input encoded moving image data constituted by a plurality of frames including image data for at least one frame which is encoded by the intra-frame mode and image data encoded by the inter-frame mode. This apparatus includes a designation means for designating an arbitrary frame of the input encoded moving image data, a decoding means for sequentially decoding the input encoded moving image data, a first output means for determining the header frame of frames designated by the designation means, and outputting the header after it is decoded, and a second output means for outputting input encoded moving image data following the header frame. With this arrangement, the apparatus side on which the input encoded moving data is generated is allowed to output moving image data to an external apparatus, e.g., an accumulating apparatus, without encoding the header frame in the intra-frame mode in advance, in the form that allows proper reproduction of image data from an arbitrary frame.

What is claimed is:

1. An image processing apparatus for processing input encoded moving image data constituted by a plurality of frames including image data for at least one frame which is encoded by an intra-frame mode and image data encoded by an inter-frame mode, comprising:

decoding means for sequentially decoding the input encoded moving image data;

designation means for designating an arbitrary frame from a display of image data decoded by said decoding means;

first output means for determining a frame designated by said designation means, and for outputting the designated frame as an anchor frame after the frame is decoded by said decoding means; and second output means for outputting input encoded moving image data following the designated frame.

2. An apparatus according to claim 1, further comprising storage means for storing the image data decoded by said decoding means in units of frames, and wherein said first output means outputs the image data from said storage means in units of frames after the image data is decoded by said decoding means.

3. An apparatus according to claim 1, wherein the input encoded moving image data is encoded data conforming to H261.

4. An apparatus according to claim 1, wherein the input encoded moving image data is input by communication using an ISDN.

5. An apparatus according to claim 1, wherein the input encoded moving image data is input from an accumulating apparatus.

6. An apparatus according to claim 1, further comprising encoding means for INTRA-encoding a frame image output from said first output means.

7. An apparatus according to claim 1, further comprising encoding means for JPEG-encoding a frame image output from said first output means.

8. An apparatus according to claim 1, further comprising accumulating means for sequentially accumulating outputs from said first and second output means.

9. An apparatus according to claim 1, further comprising control means for controlling an output order of said first and second output means.

10. An apparatus according to claim 1, wherein said second output means comprises a delay memory for delaying output of the input encoded image data following the designated frame.

11. An apparatus according to claim 1, further comprising display means for displaying moving image data decoded by said decoding means.

12. An image processing system comprising a processing apparatus for processing input encoded moving image data constituted by a plurality of frames including image data for at least one frame which is encoded by an intra-frame mode and image data encoded by an inter-frame mode, and an accumulating apparatus for accumulating processed moving image data, said processing apparatus including decoding means for sequentially decoding the input encoded moving image data, designation means for designating an arbitrary frame from a display of image data decoded by said decoding means, first output means for determining a frame designated by said designation means, and for outputting the designated frame as an anchor frame to said accumulating apparatus after the frame is decoded by said decoding means, and second output means for outputting input encoded moving image data following the designated frame to said accumulating apparatus, and said accumulating apparatus including accumulating means for accumulating an output from said second output means after accumulating an output from said first output means.

13. A system according to claim 12, further comprising storage means for storing the image data decoded by said decoding means in units of frames, and wherein said first output means outputs the image data from said storage means in units of frames after the image data is decoded by said decoding means.

14. A system according to claim 12, wherein the input encoded moving image data is encoded data conforming to H261.

15. A system according to claim 12, wherein the input encoded moving image data is input by communication using an ISDN.

16. A system according to claim 12, wherein the input encoded moving image data is input from an accumulating apparatus.

17. A system according to claim 12, further comprising encoding means for INTRA-encoding a frame image output from said first output means.

18. A system according to claim 12, further comprising encoding means for JPEG-encoding a frame image output from said first output means.

19. A system according to claim 12, further comprising accumulating means for sequentially accumulating outputs from said first and second output means.

20. A system according to claim 12, further comprising control means for controlling an output order of said first and second output means.

21. A system according to claim 20, wherein said second output means comprises a delay memory for delaying output of the input encoded image data following the designated frame.

22. An apparatus according to claim 12, further comprising display means for displaying moving image data decoded by said decoding means.

23. An image processing method for processing input encoded moving image data constituted by a plurality of frames including image data for at least one frame which is encoded by an intra-frame mode and image data encoded by an inter-frame mode, the method comprising the steps of:

sequentially decoding the input encoded moving image data;

designating an arbitrary frame from a display of image data decoded by said decoding step;

first output step for determining a frame designated by said designation step, and for outputting the designated frame as an anchor frame after the frame is decoded by said decoding step; and second output step for outputting input encoded moving image data following the designated frame.

24. A method according to claim 23, further comprising a storing step for storing the image data decoded by said decoding step in units of frames, and wherein said first output step outputs the image data from said storage step in units of frames after the image data is decoded by said decoding step.

25. A method according to claim 23, wherein the input encoded moving image data is encoded data conforming to H261.

26. A method according to claim 23, wherein the input encoded moving image data is input by communication using an ISDN.

27. A method according to claim 23, wherein the input encoded moving image data is input from an accumulating apparatus.

28. A method according to claim 23, further comprising an encoding step for INTRA-encoding a frame image output from said first output means.

29. A method according to claim 23, further comprising an encoding step for JPEG-encoding a frame image output from said first output means.

30. A method according to claim 23, further comprising an accumulating step for sequentially accumulating outputs from said first and second output steps.

31. A method according to claim 23, further comprising a control step for controlling an output order of said first and second output steps.

32. A method according to claim 23, wherein said second output step comprises a delay memory for delaying the input encoded image data following the designated frame.

33. A method according to claim 23, further comprising a display step for displaying moving image data decoded by said decoding step.

* * * * *